(12) United States Patent
Matsuoka et al.

(10) Patent No.: US 11,052,775 B2
(45) Date of Patent: Jul. 6, 2021

(54) POWER MANAGEMENT SYSTEM AND POWER MANAGEMENT METHOD

(71) Applicant: Toyota Jidosha Kabushiki Kaisha, Toyota (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/227,630

(22) Filed: Dec. 20, 2018

(65) Prior Publication Data
US 2019/0193582 A1 Jun. 27, 2019

(30) Foreign Application Priority Data
Dec. 26, 2017 (JP) .............................. JP2017-250207

(51) Int. Cl.
*B60L 53/12* (2019.01)
*B60L 58/13* (2019.01)
*G05D 1/02* (2020.01)
*H04W 84/00* (2009.01)
(Continued)

(52) U.S. Cl.
CPC ................. *B60L 53/12* (2019.02); *B60L 1/00* (2013.01); *B60L 58/13* (2019.02); *G05D 1/0291* (2013.01);
(Continued)

(58) Field of Classification Search
CPC .......... B60L 53/00; B60L 53/10; B60L 53/11; B60L 53/12; B60L 53/126; B60L 53/30;
(Continued)

(56) References Cited

U.S. PATENT DOCUMENTS 9,397,518 B1 * 7/2016 Theobald ................ H02J 50/40
10,769,555 B2 * 9/2020 Wild ........................ B60L 58/12
(Continued)

FOREIGN PATENT DOCUMENTS

JP 2012-230523 A 11/2012
JP 2013-005592 A 1/2013
(Continued)

*Primary Examiner* — Thomas G Black
*Assistant Examiner* — Sara J Lewandroski
(74) *Attorney, Agent, or Firm* — Dinsmore & Shohl LLP

(57) ABSTRACT

A second communication unit of a power receiving vehicle sends a charging start request signal to a power supplying vehicle located on a planned travel route of the power receiving vehicle. At least one of a first travel control unit of the power supplying vehicle and a second travel control unit of the power receiving vehicle brings the power supplying vehicle and the power receiving vehicle close to each other up to a position that satisfies a charging start condition when the first travel control unit receives the charging start request signal from the power receiving vehicle through a first communication unit of the power supplying vehicle. The remaining charge of a battery of the power receiving vehicle is managed by performing charging between the power supplying vehicle and the power receiving vehicle.

7 Claims, 7 Drawing Sheets

(51) Int. Cl.
*G08G 1/00* (2006.01)
*B60L 1/00* (2006.01)
*H02J 7/02* (2016.01)
*H02J 7/00* (2006.01)
*H02J 50/00* (2016.01)

(52) U.S. Cl.
CPC .............. *G08G 1/22* (2013.01); *H04W 84/00* (2013.01); *B60L 2240/10* (2013.01); *B60L 2240/622* (2013.01); *G05D 2201/0213* (2013.01); *H02J 7/0047* (2013.01); *H02J 7/0048* (2020.01); *H02J 7/025* (2013.01); *H02J 50/00* (2016.02)

(58) Field of Classification Search
CPC ........ B60L 53/305; B60L 53/32; B60L 53/34; B60L 53/35; B60L 53/36; B60L 53/37; B60L 53/38; B60L 53/39; B60L 53/50; B60L 53/51; B60L 53/52; B60L 53/53; B60L 53/54; B60L 53/55; B60L 53/56; B60L 53/57; B60L 53/60; B60L 53/65; B60L 53/66; G05D 1/0291; G05D 1/0293; G05D 1/0295; G05D 1/0297; G08G 1/22
See application file for complete search history.

(56) References Cited

U.S. PATENT DOCUMENTS

| | | | | |
|---|---|---|---|---|
| 2011/0025267 | A1* | 2/2011 | Kamen | B60L 11/1842 320/109 |
| 2014/0320062 | A1* | 10/2014 | Murayama | B60L 53/51 320/104 |
| 2016/0137077 | A1* | 5/2016 | Kim | G01C 21/3697 701/22 |
| 2016/0334234 | A1* | 11/2016 | Wild | B60L 53/62 |
| 2019/0361513 | A1* | 11/2019 | Tomoda | G06F 1/3296 |
| 2020/0067334 | A1* | 2/2020 | Fan | H02J 7/342 |

FOREIGN PATENT DOCUMENTS

| | | | | |
|---|---|---|---|---|
| JP | 2015195664 A | * | 11/2015 | |
| JP | 2016181109 A | * | 10/2016 | ............. B60L 53/68 |
| JP | 2016201884 A | | 12/2016 | |
| JP | 2017-058249 A | | 3/2017 | |
| JP | 6526476 B2 | * | 6/2019 | |
| JP | 2020038707 A | * | 3/2020 | |
| JP | 6754438 B2 | * | 9/2020 | ........... H03K 17/165 |
| JP | 6781108 B2 | * | 11/2020 | |
| WO | WO-2018047346 A1 | * | 3/2018 | ............. H04M 1/73 |

* cited by examiner

Fig.5
| Charging vehicle | Position coordinates |
|---|---|
| Charging vehicle 1 | (X1, Y1) |
| Charging vehicle 2 | (X2, Y2) |
| Charging vehicle 3 | (X3, Y3) |
| ⋮ | ⋮ |
Fig.6A
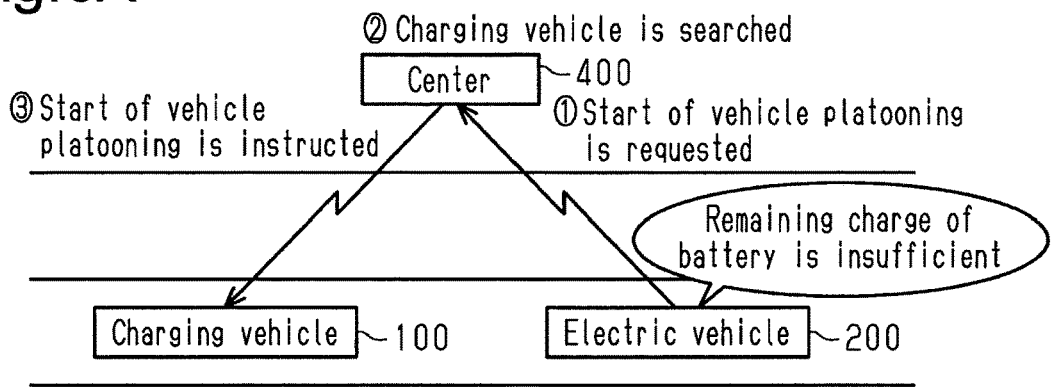
Fig.6B
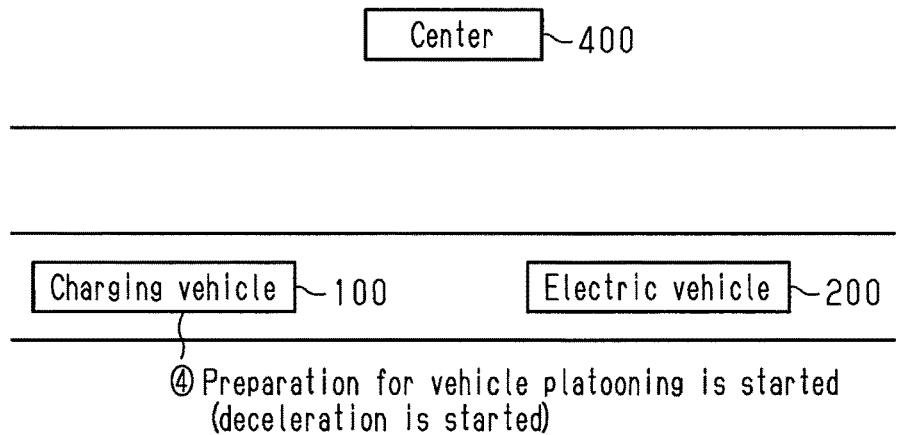
Fig.6C
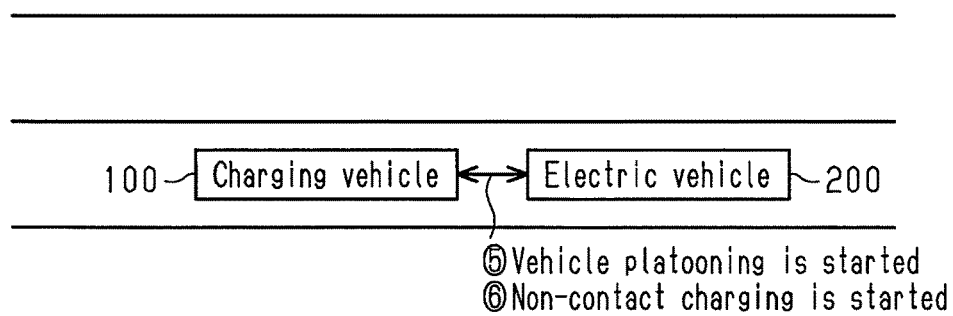

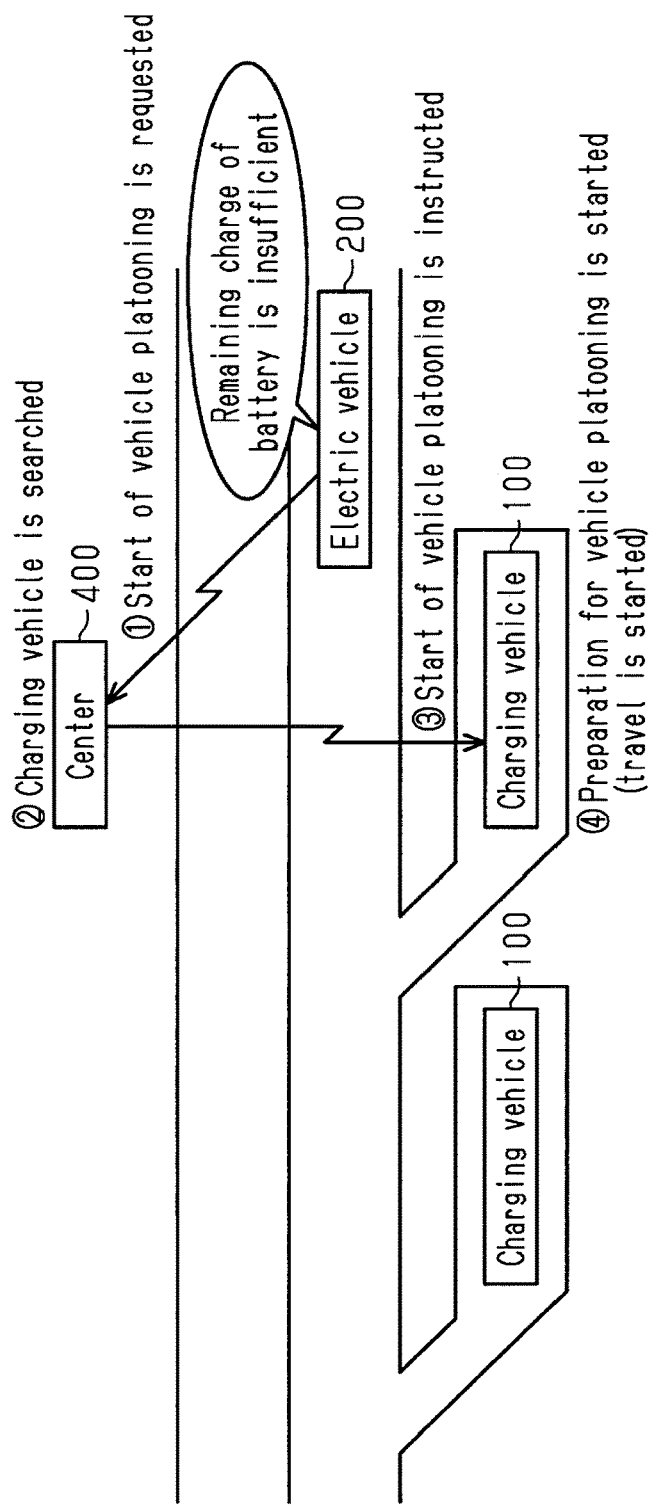
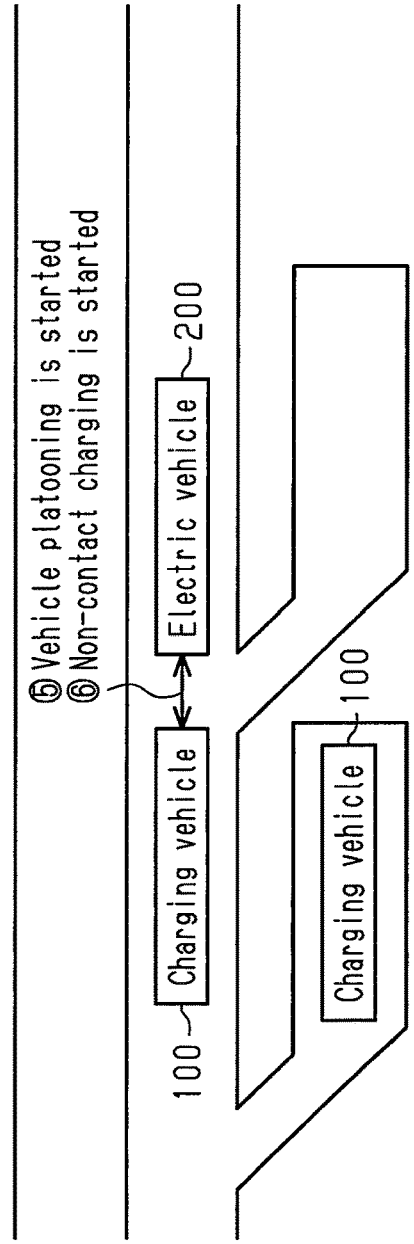
Fig.7A
Fig.7B

| Electric vehicle | Position coordinates | Charge flag |
|---|---|---|
| Electric vehicle 1 | (X1, Y1) | O |
| Electric vehicle 2 | (X2, Y2) | X |
| Electric vehicle 3 | (X3, Y3) | O |
| ⋮ | ⋮ | ⋮ |

POWER MANAGEMENT SYSTEM AND POWER MANAGEMENT METHOD

CROSS-REFERENCE TO RELATED APPLICATION

This application claims priority to Japanese Patent Application No. 2017-250207 filed on Dec. 26, 2017, incorporated herein by reference in its entirety.

BACKGROUND

The present disclosure relates to a power management system and a power management method for managing battery remaining charge of a power receiving vehicle by charging from a power supplying vehicle.

Conventionally, as an example of this type of the power management system, for example, in a system described in Japanese Laid-Open Patent Publication No. 2016-201884, non-contact charging is performed between a power receiving vehicle and a power supplying vehicle while the power receiving vehicle travels, thereby securing battery remaining charge of the power receiving vehicle during traveling, while limiting the number of charging facilities.

SUMMARY

However, in the system described in Japanese Laid-Open Patent Publication No. 2016-201884, the power supplying vehicle is not expected to be shared among a plurality of power receiving vehicles. There is thus room for improvement in the management of charging between a plurality of power receiving vehicles.

An objective of the present disclosure is to provide a power management system and a power management method that are capable of managing battery remaining charge of a power receiving vehicle without stopping the power receiving vehicle even when a power supplying vehicle is shared among a plurality of power receiving vehicles.

Examples of the present disclosure will now be described.

Example 1: A power management system is provided that performs charging between a power supplying vehicle and a power receiving vehicle to manage remaining charge of a battery of the power receiving vehicle. The power supplying vehicle includes a first travel control unit, which is configured to control travel of the power supplying vehicle, and a first communication unit, which is configured to receive a charging start request signal from the power receiving vehicle. The power receiving vehicle includes a second travel control unit, which is configured to control travel of the power receiving vehicle, and a second communication unit, which is configured to send the charging start request signal to the power supplying vehicle. The second communication unit is configured to send the charging start request signal to the power supplying vehicle that is located on a planned travel route of the power receiving vehicle. At least one of the first travel control unit and the second travel control unit is configured to bring the power supplying vehicle and the power receiving vehicle close to each other up to a position that satisfies a charging start condition when the first travel control unit receives the charging start request signal from the power receiving vehicle through the first communication unit.

With the above-described configuration, even when the power supplying vehicle is shared among a plurality of power receiving vehicles, a power receiving vehicle is brought close to the power supplying vehicle to perform charging in response to a request from the power receiving vehicle. Therefore, it is possible to manage battery remaining charge of the power receiving vehicle without stopping the power receiving vehicle.

Example 2: In the power management system of example 1, the first travel control unit may be configured to receive a planned travel route of the power receiving vehicle through the first communication unit upon receiving the charging start request signal from the power receiving vehicle, and change a planned travel route of the power supplying vehicle such that the power supplying vehicle is made to merge with the thus received planned travel route of the power receiving vehicle.

With the above-described configuration, it is possible to perform charging in response to a request from the power receiving vehicle by bringing the power receiving vehicle close to the power supplying vehicle without stopping the power supplying vehicle.

Example 3: In the power management system of Example 1 or 2, the power receiving vehicle may include a battery remaining charge monitoring unit, which is configured to monitor remaining charge of a battery of the power receiving vehicle. The second communication unit may be configured to send the charging start request signal to the power supplying vehicle when the remaining charge of the battery of the power receiving vehicle obtained by the battery remaining charge monitoring unit becomes less than a predetermined threshold.

With the above-described configuration, charging is performed only when the battery remaining charge of the power receiving vehicle is insufficient. Therefore, it is possible to efficiently perform charging between the power supplying vehicle and the power receiving vehicle.

Example 4: In the power management system of Example 3, the power receiving vehicle further may include a battery consumption prediction unit, which predicts consumption amount of remaining charge of the battery when the power receiving vehicle travels on a planned travel route. The second communication unit may be configured to send the charging start request signal to the power supplying vehicle when a difference between the remaining charge of the battery of the power receiving vehicle obtained by the battery remaining charge monitoring unit and the remaining charge of the battery of the power receiving vehicle predicted by the battery consumption prediction unit becomes equal to or larger than a predetermined threshold.

With the above-described configuration, charging is performed when the battery remaining charge is predicted to be insufficient before arrival of the power receiving vehicle at a destination of the planned travel route. Therefore, it is possible to secure the battery remaining charge of the power receiving vehicle.

Example 5: In the power management system of Example 3 or 4, the power receiving vehicle may include a travel distance obtaining unit, which obtains a travel distance of the power receiving vehicle. The second communication unit may also be configured to send the charging start request signal to the power supplying vehicle when the travel distance of the power receiving vehicle obtained by the travel distance obtaining unit becomes equal to or larger than a predetermined threshold.

With the above-described configuration, charging is performed when the battery remaining charge is predicted to be insufficient as the travel distance of the power receiving vehicle reaches a predetermined threshold or more. Therefore, it is possible to secure the battery remaining charge of the power receiving vehicle.

Example 6. In the power management system of any one of Examples 1 to 5, the power supplying vehicle may include a generator.

With the above-described configuration, by supplying electric power generated by the generator to the power receiving vehicle, it is possible to perform charging between the power supplying vehicle and the power receiving vehicle while maintaining the amount of electric power supplied from the power supplying vehicle.

Example 7: A power management method is provided that performs the various processes described in Examples 1 to 6.

Example 8: A non-transitory computer readable memory medium is provided that stores a program that causes a processor to perform the various processes described in Examples 1 to 6.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 5 is a schematic diagram showing an example of data content registered in a vehicle database of the power management system in FIG. 4;

FIG. 6A is a schematic diagram illustrating cooperative operations performed by a charging vehicle and an electric vehicle via a center when non-contact charging is performed between the charging vehicle and the electric vehicle in the power management system of FIG. 4;

FIG. 6B is a schematic diagram illustrating cooperative operations performed by a charging vehicle and an electric vehicle via a center when non-contact charging is performed between the charging vehicle and the electric vehicle in the power management system of FIG. 4;

FIG. 6C is a schematic diagram illustrating cooperative operations performed by a charging vehicle and an electric vehicle via a center when non-contact charging is performed between the charging vehicle and the electric vehicle in the power management system of FIG. 4;

FIG. 7A is a schematic diagram, illustrating cooperative operations performed by a charging vehicle and an electric vehicle via a center when non-contact charging is performed between the charging vehicle and the electric vehicle in a power management system according to a third embodiment;

FIG. 7B is a schematic diagram illustrating cooperative operations performed by a charging vehicle and an electric vehicle via a center when non-contact charging is performed between the charging vehicle and the electric vehicle in a power management system according to a third embodiment;

DETAILED DESCRIPTION

First Embodiment

A power management system according to a first embodiment will now be described with reference to FIGS. 1 to 3.

Figure 1:
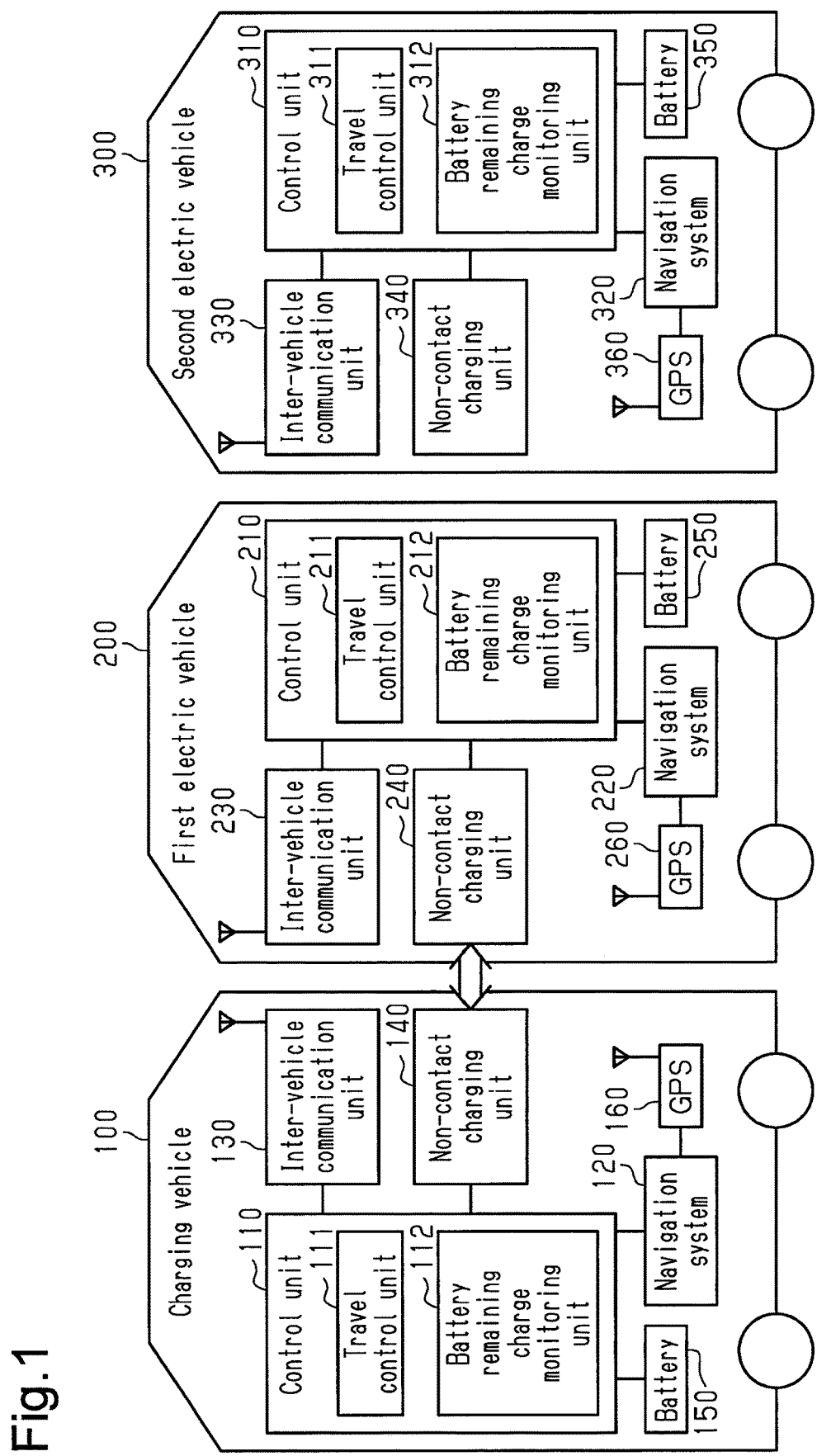
FIG. 1 is a block diagram showing a schematic configuration of a power management system according to a first embodiment of the present disclosure.

As shown in FIG. 1, the power management system of the present embodiment includes a charging vehicle, in which a large capacity battery is mounted, and a plurality of electric vehicles, in each of which a normal capacity battery is mounted. The charging vehicle, which is a power supplying vehicle, and the electric vehicles, each of which is a power receiving vehicle, perform vehicle platooning. Then, when the battery of a certain electric vehicle is insufficient in remaining charge, non-contact charging is given to that electric vehicle from the charging vehicle. Charging of the battery of the electric vehicle is performed without discontinuing traveling, thus making it possible to extend the travel distance of the electric vehicle.

A charging vehicle 100 includes a control unit 110, a navigation system 120, an inter-vehicle communication unit 130 and a non-contact charging unit 140.

The control unit 110 is to integrally control operations of the charging vehicle 100 and functions as a travel control unit 111, which controls autonomous travel of the charging vehicle 100, and as a battery remaining charge monitoring unit 112, which monitors the remaining charge of a battery 150 serving as a power source of the charging vehicle 100. That is, the travel control unit 111 is a first travel control unit, which is configured to control travel of a power supplying vehicle.

The navigation system 120 sets a planned, travel route of the charging vehicle 100 with reference to map data, based on the travel position of the charging vehicle 100 identified by a GPS 160.

The inter-vehicle communication unit 130 makes inter-vehicle communication through an inter-vehicle communication unit 230 mounted in a first electric vehicle 200 and an inter-vehicle communication unit 330 mounted in a second electric vehicle 300, thereby sending and receiving various types of information to and from each of the electric vehicles 200, 300. The various types of information include information that shows traveling conditions of the electric vehicles 200, 300 such as positions, speed and acceleration of the vehicles. Then, the travel control unit 111 shares various types of information with the first electric vehicle 200, which follows the charging vehicle 100, through the inter-vehicle communication and also adjusts the speed of the charging vehicle 100, thereby performing vehicle platooning, which keeps the distance between the charging vehicle 100 and the first electric vehicle 200 at a predetermined distance. The inter-vehicle communication unit 130 is a first communication unit, which is configured to receive a charging start request signal from a power receiving vehicle.

The non-contact, charging unit 140 performs non-contact charging with a non-contact charging unit 240 mounted in the first electric vehicle 200 during vehicle platooning through the travel control unit 111, which keeps the distance between the charging vehicle 100 and the first electric vehicle 200 at a predetermined distance. Thereby, electric power is supplied from the charging vehicle 100 to the first electric vehicle 200.

The first electric vehicle 200 includes a control unit 210, a navigation system 220, an inter-vehicle communication unit 230, and the non-contact charging unit 240.

The control unit 210 is to integrally control operations of the first electric vehicle 200 and functions as a travel control unit 211 for controlling autonomous travel of the first electric vehicle 200 and as a battery remaining charge monitoring unit 212 for monitoring the remaining charge of a battery 250 serving as a power source of the first electric vehicle 200.

The navigation system 220 sets a planned travel route of the first electric vehicle 200 with reference to map data based on the travel position of the first electric vehicle 200 identified by a GPS 260.

The inter-vehicle communication unit 230 makes inter-vehicle communication between the inter-vehicle communication unit 130 mounted in the charging vehicle 100, which precedes the first electric vehicle 200, and the inter-vehicle communication unit 330 mounted in the second electric vehicle 300, which follows the first electric vehicle 200, thereby sending and receiving various types of information to and from the charging vehicle 100 and the second electric vehicle 300. Then, the travel control unit 211 shares various types of information with the charging vehicle 100 and the second vehicle 300 through inter-vehicle communication and also adjusts the speed of the first electric vehicle 200, thereby performing vehicle platooning, which keeps the distance between the charging vehicle 100 and the first electric vehicle 200 and the distance between the first electric vehicle 200 and the second electric vehicle 300 to predetermined distances. That is, the travel control unit 211 is a second travel control unit, which is configured to control travel of the power receiving vehicle (200). Also, the inter-vehicle communication unit 230 is a second communication unit, which is configured to send a charging start request signal to the power supplying vehicle (100).

The non-contact charging unit 240 performs non-contact charging with the non-contact charging unit 140 mounted in the charging vehicle 100 when the battery 250 of the first electric vehicle 200 is insufficient in remaining charge while performing vehicle platooning, through the travel control unit 211, in which the distance between the charging vehicle 100 and the first electric vehicle 200 is kept at a predetermined distance. Therefore, electric power is supplied from the charging vehicle 100 to the first electric vehicle 200, and insufficiency of the remaining charge of the battery 250 of the first electric vehicle 200 is thereby eliminated.

The second electric vehicle 300 includes a control unit 310, a navigation system 320, an inter-vehicle communication unit 330 and a non-contact charging unit 340.

The control unit 310 is to integrally control operations of the second electric vehicle 300 and functions as a travel control unit 311 for controlling autonomous travel of the second electric vehicle 300 and as a battery remaining charge monitoring unit 312 for monitoring the remaining charge of a battery 350 serving as a power source of the second electric vehicle 300.

The navigation system 320 sets a planned travel route of the second electric vehicle 300 with reference to nap data, based on the travel position of the second electric vehicle 300 identified by a GPS 360.

The inter-vehicle communication unit 330 makes inter-vehicle communication with the inter-vehicle communication unit 230 mounted in the first electric vehicle 200, thereby sending and receiving various types of information to and from the first electric vehicle 200. Also, the inter-vehicle communication unit 330 is a second communication unit which is configured to send a charging start request signal to the power supplying vehicle (100).

Then, the travel control unit 311 shares various types of information with the first electric vehicle 200 through inter-vehicle communication and also adjusts the speed of the second electric vehicle 300, thereby performing vehicle platooning, which keeps the distance between the first electric vehicle 200 and the second electric vehicle 300 at a predetermined distance. That is, the travel control, unit 311 is a second travel control unit, which is configured to control travel of the power receiving vehicle (300).

The non-contact charging unit 340 performs non-contact charging with the non-contact charging unit 140 mounted in the charging vehicle 100 when the battery 350 of the second electric vehicle 300 is insufficient in remaining charge while performing vehicle platooning, through the travel control unit 311, which keeps the distance with the charging vehicle 100 at a predetermined distance. Therefore, electric power is supplied from the charging vehicle 100 to the second electric vehicle 300, and insufficiency of the remaining charge of the battery 350 of the second electric vehicle 300 is thereby eliminated.

Next, a description will be given of cooperative operations performed by the charging vehicle 100 and the second electric vehicle 300 when non-contact charging is performed between the charging vehicle 100 and the second electric vehicle 300 in the present embodiment.

In the following description, when the charging vehicle 100 is described to perform an operation, the actual agent of the operation may be a processor incorporated in the control unit 110 of the charging vehicle 100. Specifically, when the charging vehicle 100 is described to perform various types of operations, the processor in the control unit 110 may execute programs stored in the memory of the control unit 110. Based on the instruction from the processor in the control unit 110, various types of devices incorporated in the charging vehicle 100 may execute operations. That is, "the processor in the control unit 110 or various types of devices of the charging vehicle 100 execute various types of operations" may be hereinafter simply referred to as "the charging vehicle 100 performs various types of operations." In the same manner, when the first electric vehicle 200 is described to perform an operation, the actual agent of the operation may be a processor incorporated in the control unit 210 of the first electric vehicle 200. Specifically, when the first electric vehicle 200 is described to perform various types of operations, the processor in the control unit 210 may execute programs stored in the memory of the control unit 210. Based on the instruction from, the processor in the control unit 210, various types of devices incorporated in the first electric vehicle 200 may execute operations. That is, "the processor in the control unit 210 or various types of devices of the first electric vehicle 200 execute various types of operations" may be hereinafter simply referred to as "the first electric vehicle 200 performs various types of operations." In the same manner, when the second electric vehicle 300 is described to perform an operation, the actual agent of the operation may be a processor incorporated in the control unit 310 of the second electric vehicle 300. Specifically, when the second electric vehicle 300 is described to perform various types of operations, the processor in the control unit 310 may execute programs stored in the memory of the control unit 310. Based on the instruction from the processor in the control unit 310, various types of devices incorporated in the second electric vehicle 300 may execute operations. That is, "the processor in the control unit 310 or various types of devices of the second electric vehicle 300 execute various types of operations" may be hereinafter simply referred to as "the second electric vehicle 300 performs various types of operations."

Figure 2A:
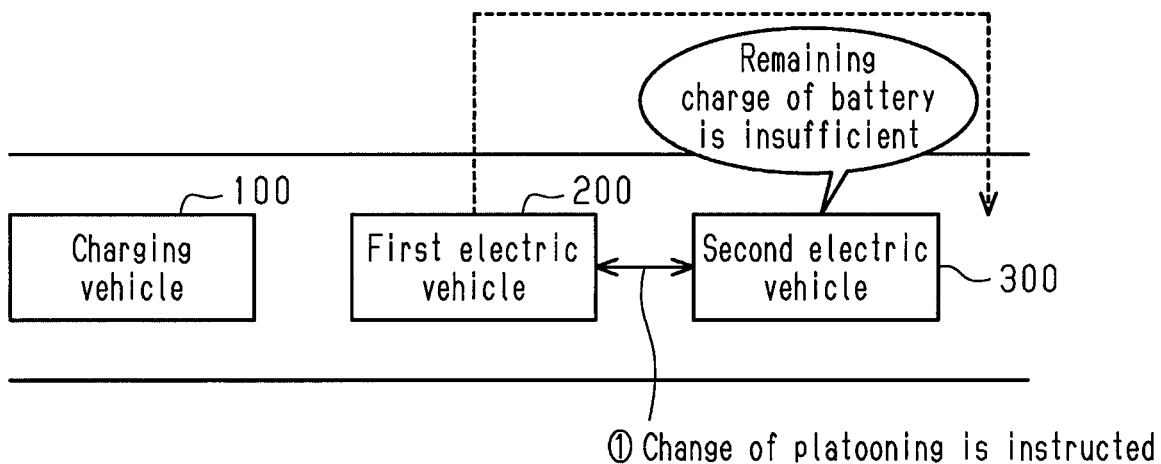
FIG. 2A is a schematic diagram illustrating cooperative operations performed by a charging vehicle and an electric vehicle when non-contact charging is performed between the charging vehicle and the electric vehicle.

As shown in FIG. 2A, when the battery 350 of the second electric vehicle 300 is insufficient in remaining charge while the second electric vehicle 300 follows the first electric vehicle 200, the second electric vehicle 300 first instructs, through inter-vehicle communication, the first electric vehicle 200 to change platooning. Then, upon receiving the instruction to change platooning from the second electric vehicle 300, the first electric vehicle 200 moves, with a lane change, to a position that follows the second electric vehicle 300 based on the thus received instruction.

Figure 2B:
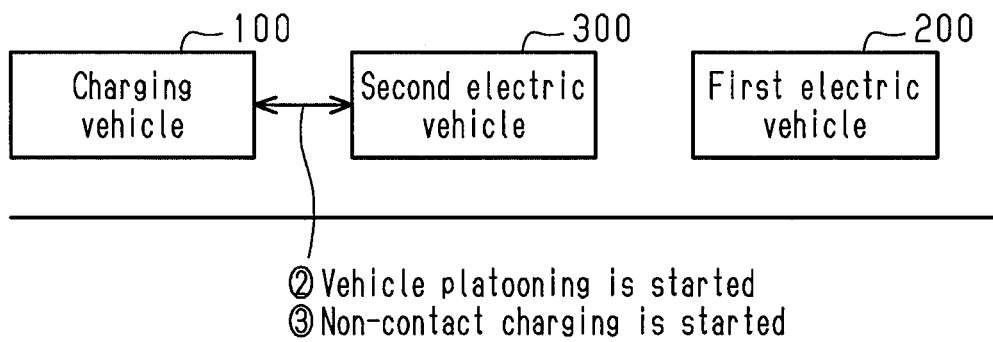
FIG. 2B is a schematic diagram illustrating cooperative operations performed by a charging vehicle and an electric vehicle when non-contact charging is performed between the charging vehicle and the electric vehicle.

Then, as shown in FIG. 2B, after moving to a position that follows the charging vehicle 100, the second electric vehicle 300 starts vehicle platooning with the charging vehicle 100. Then, when the distance between the charging vehicle 100 and the second electric vehicle 300 is kept at a predetermined distance, non-contact charging is started between the charging vehicle 100 and the second electric vehicle 300. Therefore, electric power is supplied from the charging vehicle 100 to the second electric vehicle 300, and insufficiency of the remaining charge of the battery 350 of the second electric vehicle 300 is thereby eliminated. Thus, at least one of the first travel control unit (111) of the charging vehicle 100 and the second travel control unit (311) of the second electric vehicle 300 brings the power supplying vehicle (100) and the power receiving vehicle (300) close to each other up to a position that satisfies a charging start condition, when the first travel control unit (111) receives a charging start request signal from the power receiving vehicle (300) through the first communication unit (130).

Next, a description will be given of a flow of processing when non-contact charging is performed between the charging vehicle 100 and the second electric vehicle 300 in the present embodiment.

Figure 3:
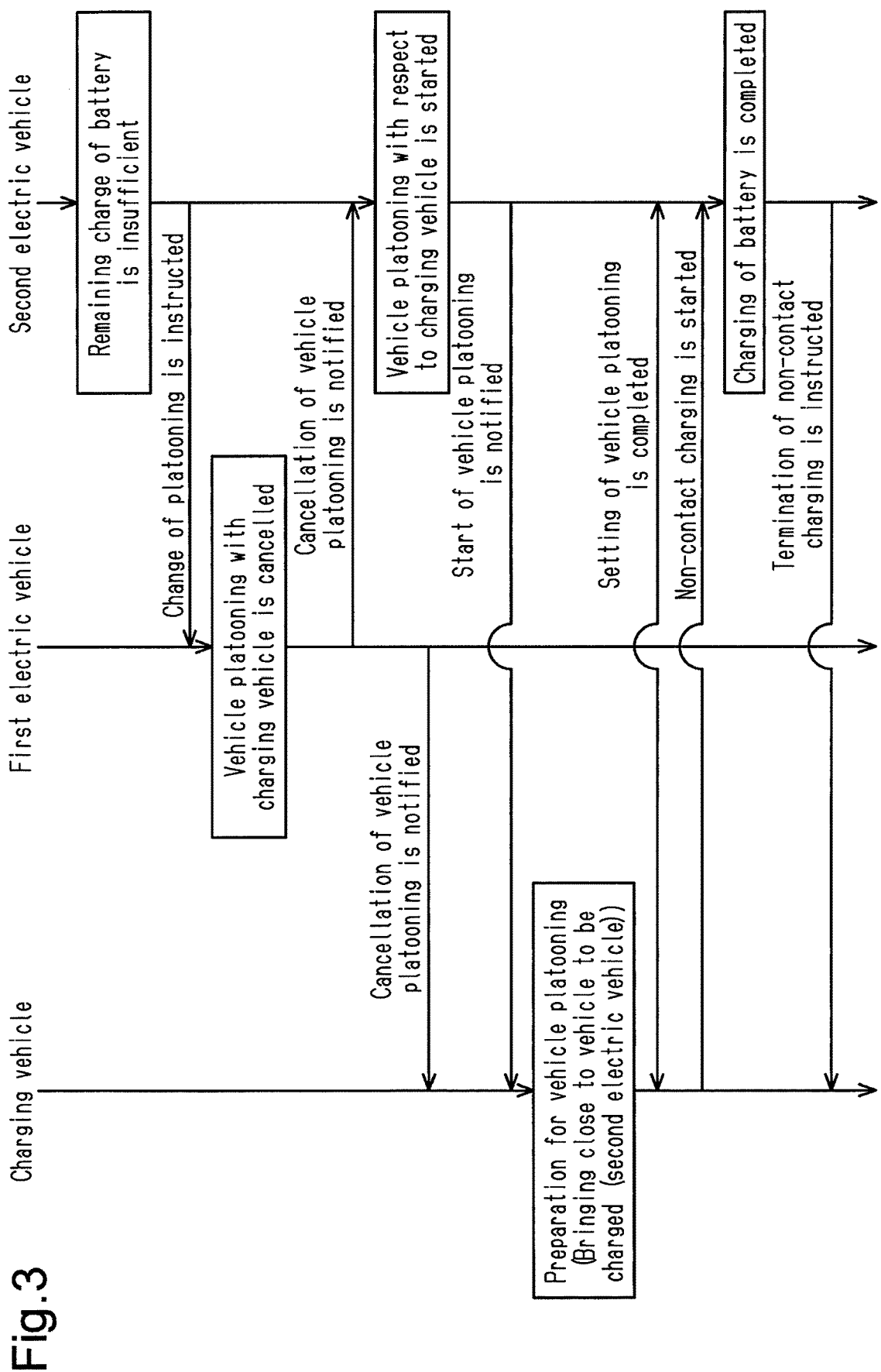
FIG. 3 is a sequence chart showing a flow of processing when non-contact charging is performed between a charging vehicle and an electric vehicle in the power management system of FIG. 1.

As shown in FIG. 3, when the battery 350 of the second electric vehicle 300 is insufficient in remaining charge, the second electric vehicle 300 instructs, through inter-vehicle communication, the first electric vehicle 200 to change platooning.

Then, upon receiving the instruction to change platooning from the second electric vehicle 300, the first electric vehicle 200 cancels the vehicle platooning with respect to the charging vehicle 100, which is performed by the travel control unit 211. The first electric vehicle 200 also notifies, through inter-vehicle communication, the charging vehicle 100 of cancellation of the vehicle platooning.

Further, the first electric vehicle 200 notifies, through inter-vehicle communication, the second electric vehicle 300 of cancellation of the vehicle platooning. Then, upon receiving notification of cancellation of the vehicle platooning from the first electric vehicle 200, the second electric vehicle 300 starts the vehicle platooning with respect to the charging vehicle 100 based on the thus received notification. At this time, the second electric vehicle 300 notifies, through inter-vehicle communication, the charging vehicle 100 of start of the vehicle platooning.

In contrast, upon receiving the notification of start of the vehicle platooning from the second electric vehicle 300, the charging vehicle 100 prepares for vehicle platooning based on the thus received notification. In this preparation for the vehicle platooning, the charging vehicle 100 starts to come closer to the second electric vehicle 300, which is to be charged.

Then, when setting of the vehicle platooning between the charging vehicle 100 and the second electric vehicle 300 is completed, non-contact charging is started between the charging vehicle 100 and the second electric vehicle 300. Therefore, electric power is supplied from the charging vehicle 100 to the second electric vehicle 300.

Then, when charging of the battery 350 of the second electric vehicle 300 is completed, the second electric vehicle 300 instructs the charging vehicle 100 to terminate non-contact charging.

The above-described first embodiment has the following advantages.

(1) When the charging vehicle 100 is shared among the plurality of electric vehicles 200 and 300, the second electric vehicle 300 is brought close to the charging vehicle 100 to perform non-contact charging in response to a request from the second electric vehicle 300. Therefore, it is possible to manage the remaining charge of the battery 350 of the second electric vehicle 300 without stopping the second electric vehicle 300.

(2) The second electric vehicle 300 sends a charging start request signal to the charging vehicle 100 when the remaining charge of the battery 350 becomes lower than a predetermined threshold. That is, non-contact charging is performed only when the battery 350 of the second electric vehicle 300 is insufficient in remaining charge. Therefore, it is possible to efficiently perform non-contact charging between the charging vehicle 100 and the second electric vehicle 300. The charging start request signal includes a vehicle platooning start request signal.

Second Embodiment

Next, a description will be given of the second embodiment of the power management system with reference to FIGS. 4 to 6C. The second embodiment is different from the first embodiment in that an electric vehicle makes a charging start request to a charging vehicle through communication via a center. Therefore, in the following description, configurations different from those of the first embodiment will be mainly described, and overlapping description of the same or equivalent configurations as those of the first embodiment will be omitted.

Figure 4:
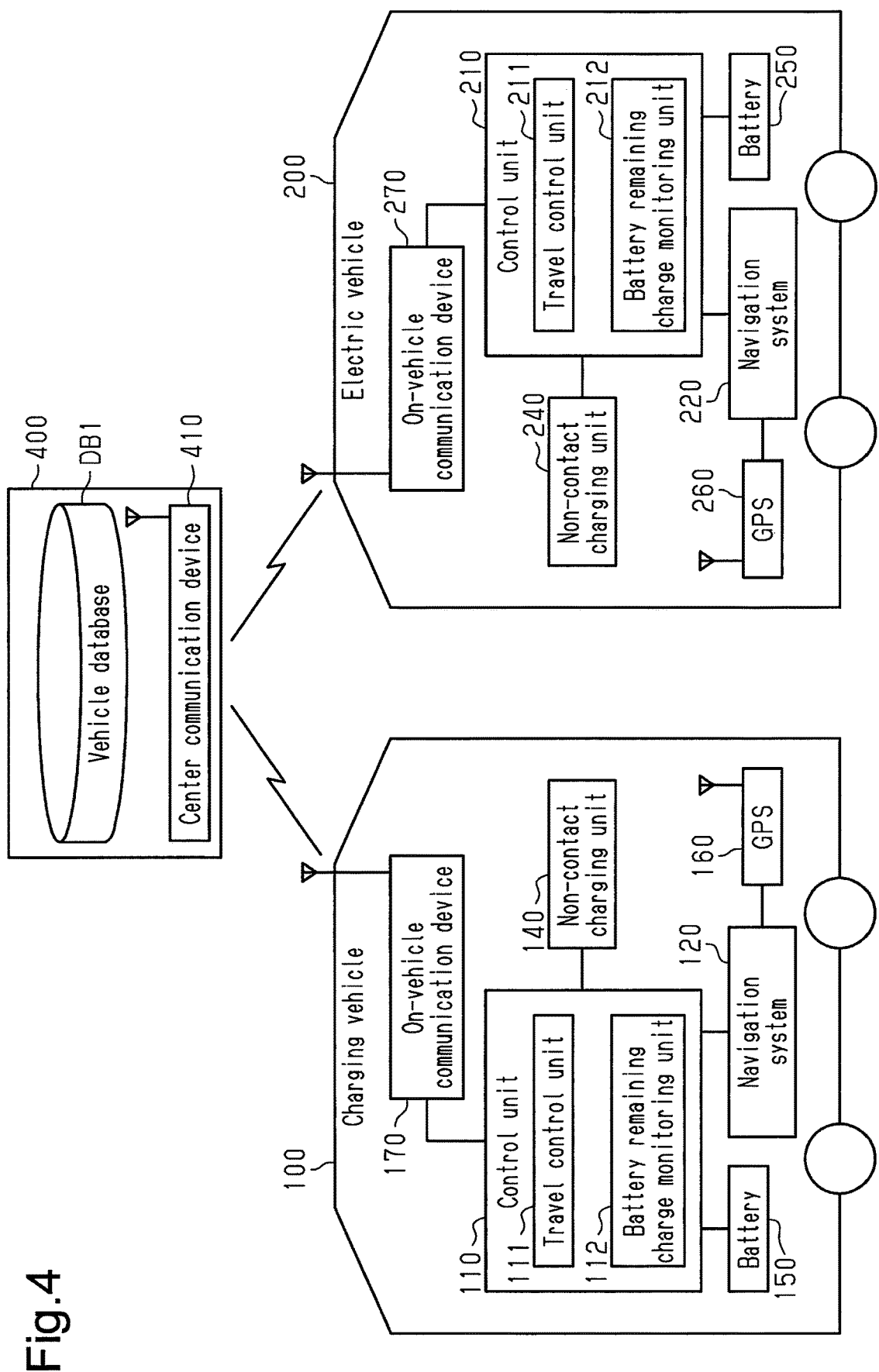
FIG. 4 is a block diagram showing a schematic configuration of a power management system according to a second embodiment.

As shown in FIG. 4, in the present embodiment, a charging vehicle 100 includes an on-vehicle communication device 170, which makes communication with a center communication device 410 included in a center 400 via a cell phone communication network in place of the inter-vehicle communication unit 130. An electric vehicle 200 also includes an on-vehicle communication device 270, which makes communication with the center communication device 410 included in the center 400 via the cell phone communication network in place of the inter-vehicle communication unit 230. That is, the on-vehicle communication device 170 functions as a first communication unit, which is configured to receive a charging start request signal from the power receiving vehicle (200), and the on-vehicle communication device 270 functions as a second communication unit, which is configured to send a charging start request signal to the power supplying vehicle (100).

The center 400 includes a vehicle database DB1 for managing travel information on a plurality of vehicles. More specifically, as shown in FIG. 5, in the vehicle database DB1, a plurality of charging vehicles 100 are managed by being associated with position coordinates on individual map data of the charging vehicles 100.

Next, a description will be given of cooperative operations performed by the electric vehicle 200 and the center 400 when non-contact charging is performed between the charging vehicle 100 and the electric vehicle 200 in the present embodiment.

As shown in FIG. 6A, when a battery 250 is insufficient in remaining charge during traveling, the electric vehicle 200 first sends a vehicle platooning start request signal to the center 400 through the on-vehicle communication device 270 so as to start non-contact charging with the charging vehicle 100.

Then, upon receiving the vehicle platooning start request signal from the electric vehicle 200, the center 400 searches for a charging vehicle 100, which is to give non-contact charging, with reference to the vehicle database DB1 based on location information on the electric vehicle 200 included in the received request signal.

Then, the center 400 instructs the thus searched for charging vehicle 100 to start vehicle platooning with the electric vehicle 200. At this time, the instruction to start the vehicle platooning that the charging vehicle 100 receives from the center 400 includes the location information on the electric vehicle 200, which made the request.

Next, as shown in FIG. 6B, upon receiving the instruction to start vehicle platooning from the center 400, the charging vehicle 100 starts to prepare for vehicle platooning. At this time, the charging vehicle 100 starts to decelerate so as to come close to the electric vehicle 200 based on the location information on the electric vehicle 200 received from the center 400.

Next, as shown in FIG. 6C, the vehicle platooning with the charging vehicle 100 and the electric vehicle 200 is started. Then, when the distance between the charging vehicle 100 and the electric vehicle 200 is kept at a predetermined distance, non-contact charging is started between the charging vehicle 100 and the electric vehicle 200.

As described above, the second embodiment has the following advantage in addition to the advantages (1) and (2) of the first embodiment.

(3) The electric vehicle 200 searches for, via the center 400 through a cell phone communication network, the charging vehicle 100, which is to give non-contact charging. Therefore, even when the distance between the charging vehicle 100 and the electric vehicle 200 is great, it is made possible to arrange the charging vehicle 100 at the position of the electric vehicle 200, and the versatility of perform non-contact charging is increased.

Third Embodiment

Next, a description will be given of a third embodiment of the power management system with reference to FIGS. 7A and 7B. The third embodiment is different from the second embodiment in that an electric vehicle makes a charging start request to a charging vehicle that is parked at a parking area. Therefore, in the following description, configurations which are different from those of the second embodiment will be mainly described, and overlapping description of the same or equivalent configurations as those of the second embodiment will be omitted.

As shown in FIG. 7A, in the present embodiment, when a battery 250 is insufficient in remaining charge during traveling, an electric vehicle 200 first sends a vehicle platooning start request signal, through an on-vehicle communication device 270, to a center 400 so as to start non-contact charging with a charging vehicle 100.

Next, upon receiving the vehicle platooning start request signal from the electric vehicle 200, the center 406 searches for a charging vehicle 100, which is to give non-contact charging, with reference to a vehicle database DB1 based on location information on the electric vehicle 200 included in the thus received request signal.

Then, the center 400 instructs the thus searched for charging vehicle 100 to start vehicle platooning with the electric vehicle 200. At this time, the instruction to start the vehicle platooning that the charging vehicle 100 receives from the center 400 includes the location information on the electric vehicle 200, which made the request.

Next, as shown in FIG. 7B, upon receiving the instruction to start the vehicle platooning from the center 400, the charging vehicle 100 starts to prepare for the vehicle platooning. At this time, the charging vehicle 100 is kept parked at a parking area and the charging vehicle 100 starts to travel at a point in time judged based on the location information on the electric vehicle 200 received from the center 400. Then, the vehicle platooning with the charging vehicle 100 and the electric vehicle 200 is started. Then, when the distance between the charging vehicle 100 and the electric vehicle 200 is kept at a predetermined distance, non-contact charging is started between the charging vehicle 100 and the electric vehicle 200.

As described above, the third embodiment has the following advantage in addition to the advantages (1) and (2) of the first embodiment.

(4) At a point in time according to the travel position of the electric vehicle 200, the charging vehicle 100 starts to travel. Therefore, as compared with a case where the charging vehicle 100 is made to travel constantly, consumption amount of the battery 150 in association with travel of the charging vehicle 100 is suppressed. It is thereby possible to enhance energy efficiency of the power management system as a whole.

Fourth Embodiment

Next, a description will be given of a fourth embodiment of the power management system with reference to FIG. 8. The fourth embodiment is different from the first embodiment in that non-contact charging is performed between vehicles in each of which a normal capacity battery is mounted without making a charging vehicle, in which a large capacity battery is mounted, travel. Therefore, in the following description, configurations different from those of the first embodiment will be mainly described, and overlapping description of the same or equivalent configurations as those of the first embodiment will be omitted.

That is, in the present embodiment, a first electric vehicle 200 functions as a power supplying vehicle, and a travel control unit 211 functions as a first travel control unit, which is configured to control travel of the power supplying vehicle. Also, an inter-vehicle communication unit 230 functions as a first communication unit, which is configured to receive a charging start request signal from a second electric vehicle 300 as a power receiving vehicle.

Figures 8, 9:
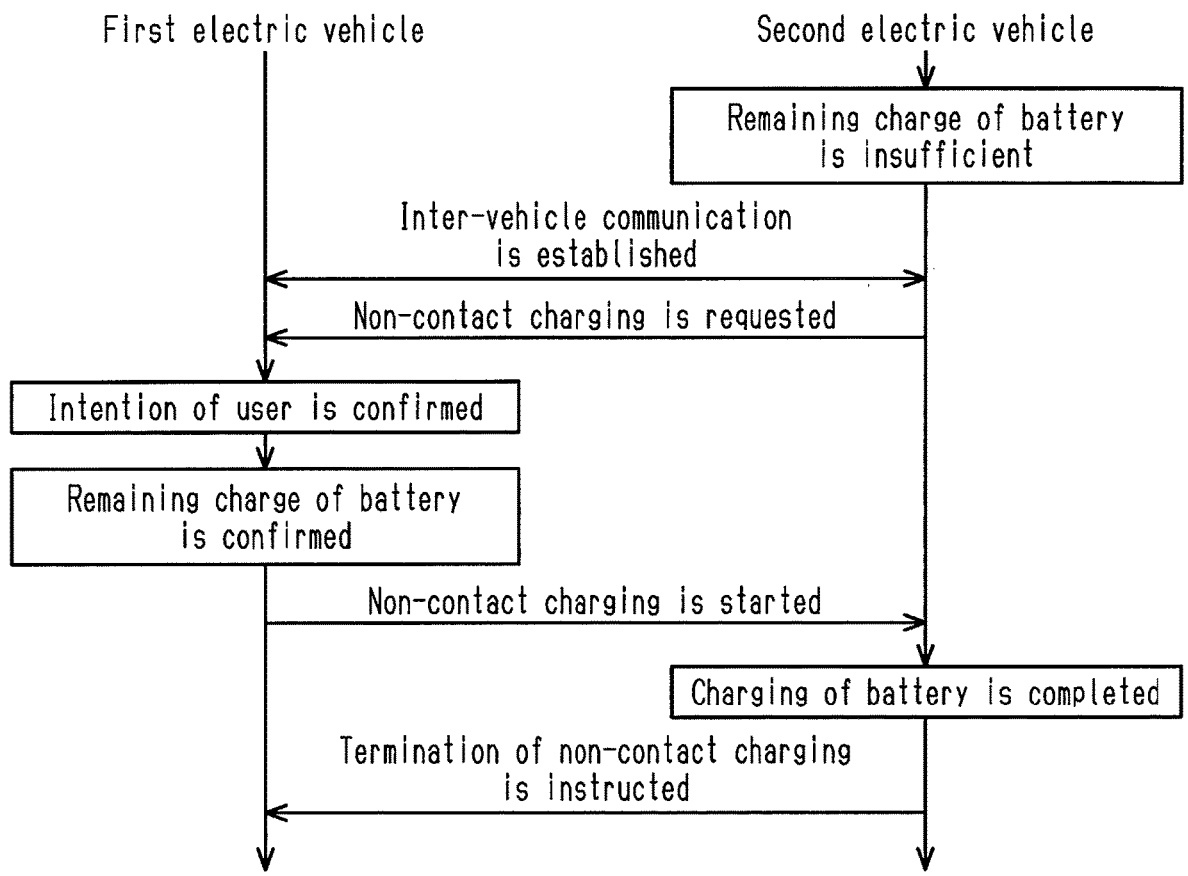
FIG. 8 is a sequence chart showing a flow of processing when non-contact charging is performed between electric vehicles in a power management system according to a fourth embodiment.
FIG. 9 is a schematic diagram showing an example of data content of a database that is managed by a center in a power management system according to another embodiment.

As shown in FIG. 8, in the present embodiment, the first electric vehicle 200 and the second electric vehicle 300 are assumed to travel in parallel on a road. Then, when a battery 250 is insufficient in remaining charge during traveling, the second electric vehicle 300 first establishes inter-vehicle communication with the first electric vehicle 200. Then, when the inter-vehicle communication is established between the first electric vehicle 200 and the second electric vehicle 300, the second electric vehicle 300 sends a non-contact charging request to the first electric vehicle 200.

Upon receiving the non-contact charging request from the second electric vehicle 300, the first electric vehicle 200 receives input of the intention of a user for non-contact charging. Then, after the user inputs approval of non-contact charging, the first electric vehicle 200 confirms the remaining charge of the battery 250 through a battery remaining charge monitoring unit 212.

Then, the first electric vehicle 200 starts to give non-contact charging to the second electric vehicle 300 when the remaining charge of the battery 250 is equal to or larger than a predetermined threshold.

Thereafter, the first electric vehicle 200 instructs the second electric vehicle 300 to terminate non-contact charging when charging of the battery 250 is completed.

As described above, the fourth embodiment has the following advantage in addition to the advantages (1) and (2) of the first embodiment.

(5) It is possible to manage the remaining charge of the battery 350 of the second electric vehicle 300 without preparing a charging vehicle 100 in advance.

Other Embodiments

The above-described embodiments may be modified as follows. The above-described embodiments and the following modifications can be combined as long as the combined modifications remain technically consistent with each other.

In the above-described fourth embodiment, the first electric vehicle 200 receives input of the intention of a user for non-contact upon receiving a non-contact charging request. Instead of this, as shown in FIG. 9, a center 400 may manage a charge flag, which indicates whether or not non-contact charging can be given to each of a plurality of first electric vehicles 200. Then, a first electric vehicle 200 sends a non-contact charging start request signal to the center 400 when a battery 250 is insufficient in remaining charge. The center 400 may search for the first electric vehicle 200, which is the main body of the non-contact charging, with reference to the charge flag based on the location information on the first electric vehicle 200 included in the request signal.

In each of the above-described embodiments, as an example, a description has been given of a case where the charging vehicle 100 is an electric vehicle that runs with the battery 150 as a power source. However, the charging vehicle 100 is not necessarily required to be an electric vehicle but may be a vehicle in which a generator is mounted. The vehicle with a generator includes, for example, a fuel cell vehicle (FCV), a hybrid vehicle (HV) and a vehicle in which solar cells are mounted.

In each of the above-described embodiments, when the battery 250, 350 of the electric vehicle 200, 300 is insufficient in remaining charge, it is configured such that a non-contact charging start request is made. However, a point in time to start non-contact charging is not necessarily limited to when the battery 250, 350 of the electric vehicle 200, 300 is insufficient in remaining charge. Instead, non-contact charging may be started, for example, under such conditions that the travel distance of the electric vehicle 200, 300 becomes equal to or larger than a predetermined threshold. Further, if the electric vehicle 200, 300 has a function to predict the remaining charge of the battery 250, 350 for traveling on a planned travel route set by the navigation system 220, 320, non-contact charging may be started when a difference between the remaining charge of the battery 250, 350 obtained by the battery remaining charge monitoring unit 212, 312 when the electric vehicle 200, 300 travels according to the planned travel route and the remaining charge of the battery predicted by the above-described function becomes equal to or larger than a predetermined threshold.

In the above-described first, second and fourth embodiments, the power supplying, vehicle (the charging vehicle 100 or the first electric vehicle 200) may receive, through inter-vehicle communication or cell phone communication, planned travel routes of the power receiving vehicles (the first electric vehicle 200 and the second electric vehicle 300) to change a planned travel route of the power supplying vehicle such that the power supplying vehicle is made to merge with the thus received planned travel routes of the power receiving vehicles. Accordingly, it is possible to perform non-contact charging in response to a request from the power receiving vehicle by bringing the power receiving vehicle close to the power supplying vehicle without stopping the power supplying vehicle.

In each of the above-described embodiments, it is configured such that non-contact charging is performed between the power supplying vehicle (the charging vehicle 100 or the first electric vehicle 200) and the power receiving vehicles (the first electric vehicle 200 and the second electric vehicle 300) to supply electric power from the power supplying vehicle to the power receiving vehicles. However, a charging method between the power supplying vehicle and the power receiving vehicles is not necessarily non-contact charging, but charging of the vehicles may be performed when the individual vehicles travels, for example, by connecting the vehicles by using a charging cable.

The controller that implements various control units can be constructed by a device that includes a CPU and a ROM and executes software processing, but is not limited to this configuration. For example, at least part of the processes executed by the software in the above-described embodiments may be executed by hardware circuits dedicated to execution of these processes (such as ASIC). That is, the controller may be modified as long as if has any one of the following configurations (a) to (c). (a) A configuration including a processor that executes all of the above-described processes according to programs and a program, storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A power management system, which performs charging between a power supplying vehicle and a power receiving vehicle to manage remaining charge of a battery of the power receiving vehicle, wherein:
   the power supplying vehicle includes:
      a first travel control unit, which is configured to control travel of the power supplying vehicle, and
      a first communication unit, which is configured to receive a charging start request signal from the power receiving vehicle,
   the power receiving vehicle includes:
      a second travel control unit, which is configured to control travel of the power receiving vehicle,
      a second communication unit, which is configured to send the charging start request signal to the power supplying vehicle,
      a battery remaining charge monitoring unit, which is configured to monitor a remaining charge of the battery of the power receiving vehicle, and
      a battery consumption prediction unit, which predicts a remaining charge of the battery when the power receiving vehicle travels on a planned travel route,
   the second communication unit is configured to send the charging start request signal to the power supplying vehicle that is located on the planned travel route of the power receiving vehicle when a difference between the remaining charge of the battery of the power receiving vehicle obtained by the battery remaining charge monitoring unit and the remaining charge of the battery of the power receiving vehicle predicted by the battery consumption prediction unit becomes equal to or larger than a predetermined threshold, and
   at least one of the first travel control unit and the second travel control unit is configured to bring the power supplying vehicle and the power receiving vehicle close to each other up to a position that satisfies a charging start condition when the first travel control unit receives the charging start request signal from the power receiving vehicle through the first communication unit.

2. The power management system according to claim 1, wherein the first travel control unit is configured to:
   receive the planned travel route of the power receiving vehicle through the first communication unit upon receiving the charging start request signal from the power receiving vehicle, and
   change a planned travel route of the power supplying vehicle such that the power supplying vehicle is made to merge with the thus received planned travel route of the power receiving vehicle.

3. The power management system according to claim 1, wherein:
   the second communication unit is configured to send the charging start request signal to the power supplying vehicle when the remaining charge of the battery of the power receiving vehicle obtained by the battery remaining charge monitoring unit becomes less than a predetermined threshold.

4. The power management system according to claim 3, wherein:
   the power receiving vehicle further includes a travel distance obtaining unit, which obtains a travel distance of the power receiving vehicle, and
   the second communication unit is configured to send the charging start request signal to the power supplying vehicle when the travel distance of the power receiving vehicle obtained by the travel distance obtaining unit becomes equal to or larger than a predetermined threshold.

5. The power management system according to claim 1, wherein the power supplying vehicle further includes a generator.

6. A non-transitory computer readable medium that stores a program for causing a processor to execute a power management process of a power receiving vehicle, the power management process comprising:
   managing remaining charge of a battery of the power receiving vehicle by performing charging between a power supplying vehicle and the power receiving vehicle,
   sending a charging start request signal to the power supplying vehicle located on a planned travel route of the power receiving vehicle through a second communication unit of the power receiving vehicle when a difference between a remaining charge of the battery of the power receiving vehicle obtained by a battery remaining charge monitoring unit and a remaining charge of the battery of the power receiving vehicle predicted by a battery consumption prediction unit becomes equal to or larger than a predetermined threshold, and
   when the power supplying vehicle receives the charging start request signal from the power receiving vehicle through a first communication unit of the power supplying vehicle, controlling traveling of at least one of the power supplying vehicle and the power receiving vehicle such that the power supplying vehicle and the power receiving vehicle are brought close to each other up to a position that satisfies a charging start condition.

7. A power management method comprising:
   managing remaining charge of a battery of a power receiving vehicle by performing charging between a power supplying vehicle and the power receiving vehicle;
   sending a charging start request signal to the power supplying vehicle located on a planned travel route of the power receiving vehicle through a second communication unit of the power receiving vehicle when a difference between a remaining charge of the battery of the power receiving vehicle obtained by a battery remaining charge monitoring unit and a remaining charge of the battery of the power receiving vehicle predicted by a battery consumption prediction unit becomes equal to or larger than a predetermined threshold; and
   when the power supplying vehicle receives the charging start request signal from the power receiving vehicle through a first communication unit of the power supplying vehicle, controlling traveling of at least one of the power supplying vehicle and the power receiving vehicle such that the power supplying vehicle and the power receiving vehicle are brought close to each other up to a position that satisfies a charging start condition.

* * * * *